United States Patent
Akao et al.

(10) Patent No.: US 6,694,734 B2
(45) Date of Patent: Feb. 24, 2004

(54) VARIABLE DISPLACEMENT SUPERCHARGING SYSTEM AND METHOD FOR DETECTING ABNORMALITY OF SUPERCHARGING SYSTEM

(75) Inventors: Yoshiyuki Akao, Yokohama (JP); Youichi Ohgaki, Kawasaki (JP); Susumu Kohketsu, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/269,002

(22) Filed: Oct. 11, 2002

(65) Prior Publication Data

US 2003/0084886 A1 May 8, 2003

(30) Foreign Application Priority Data

Oct. 11, 2001 (JP) ......................................... 2001-313516

(51) Int. Cl.$^7$ ............................................... F02B 33/44
(52) U.S. Cl. ...................... 60/605.1; 60/611; 123/559.1
(58) Field of Search ............................ 60/605.1, 605.2, 60/611; 123/559.1

(56) References Cited

U.S. PATENT DOCUMENTS

| | | | | | |
|---|---|---|---|---|---|
| 5,996,347 | A | * | 12/1999 | Nagae et al. | 60/602 |
| 6,408,625 | B1 | * | 6/2002 | Woon et al. | 60/608 |
| 6,408,834 | B1 | * | 6/2002 | Brackney et al. | 123/568.21 |
| 6,510,692 | B2 | * | 1/2003 | Shirakawa | 60/602 |
| 6,625,985 | B2 | * | 9/2003 | Shirakawa | 60/602 |

FOREIGN PATENT DOCUMENTS

JP 3-52986 Y2 11/1991

* cited by examiner

Primary Examiner—Hoang Nguyen
(74) Attorney, Agent, or Firm—Birch, Stewart, Kolasch & Birch, LLP

(57) ABSTRACT

An ECU preliminarily obtains a target supercharging pressure determined based on an engine rotational speed and an engine load, and stores the target supercharging pressure value. The ECU commands a flow passage area changing unit to set an exhaust gas flow passage area to the maximum flow passage area or the minimum flow passage area, and judges the abnormality of a supercharger by comparing supercharging pressure detected by a supercharging pressure sensor and the stored target supercharging pressure.

8 Claims, 4 Drawing Sheets

VARIABLE DISPLACEMENT SUPERCHARGING SYSTEM AND METHOD FOR DETECTING ABNORMALITY OF SUPERCHARGING SYSTEM

BACKGROUND OF THE INVENTION

This non-provisional application claims priority under 35 U.S.C. §109(a) on Patent Application No. 2001-313516 filed in Japan on Oct. 11, 2001, which is herein incorporated by reference.

1. Field of the Invention

The present invention relates to a variable displacement supercharging system, and more specifically to a variable displacement supercharging system, which can determine abnormality of a variable displacement supercharger capable of changing the area of an exhaust gas flow passage toward a turbine.

2. Description of the Related Art

Conventionally, as a technique for enhancing an output of an engine, a technique, which mounts a supercharger (a turbo charger) on the engine, is known. The supercharger compresses intake air by a compressor, which is driven by the energy of the exhaust gas from the engine. The supercharger thus increases the charging efficiency of the intake air and enhances output of the engine.

A special type of supercharger, a variable displacement supercharger, has been made commercially available. This variable displacement supercharger includes a changeover valve, which opens or closes a portion of an exhaust passage according to the rotational speed of the engine. The changeover valve controls the speed of exhaust gas flowing towards a turbine of the supercharger by changing the area of the exhaust gas passage. That is, when the engine is rotated at a relatively low speed, the portion of the passage leading towards the turbine is closed to increase the flow speed of the exhaust gas flowing towards the turbine. When the engine is rotated at a relatively high speed, the flow passage leading toward the turbine is fully opened to substantially enlarge the capacity of the turbine, thus effectively making use of the energy of the exhaust gas.

However, such a variable displacement supercharger breaks down, it is impossible to control the flow speed of the exhaust gas flowing towards the turbine by using the changeover valve. Therefore, when the engine is rotated at a relatively low speed, there is a possibility that knocking occurs due to a sharp rise in supercharging pressure (pressure of intake air), while when the engine is rotated at a relatively high speed, there is a possibility that the exhaust gas pressure at the upstream of the turbine is increased so that the amount of residual gas is increased, which may cause reduction of engine output or increase the possibility of misfire.

Accordingly, as a supercharger, which can overcome such a drawback by detecting a breakdown of the variable displacement supercharger, a supercharger disclosed in Japanese Laid-open Utility Model Publication 52986/1991 is known.

In the "engine provided with a supercharger" disclosed therein, the supercharging pressure corresponding to the rotational speed of an engine in a normal engine running state is previously stored in a memory, the engine rotational speed and the supercharging pressure are detected, the detected supercharging pressure is compared with the stored supercharging pressure, and when the supercharging pressure becomes abnormally high, it is determined that the changeover valve has broken down.

However, in a variable displacement supercharger, even when the area of the exhaust gas passage leading towards the turbine is the same and the rotational speed, the load applied to the engine and the like are also the same, the detected values of the supercharging pressure may differ largely and thus a break down maybe erroneously determined. That is, in the variable displacement supercharger, the exhaust gas passage is opened or closed by performing the open/close operation of the changeover valve. Therefore, due to the influence of inertia of the supercharger per se, there is a time lag for the rotational speed of the turbine to reach a given rotational speed, that is, until the supercharging pressure reaches a given level. Accordingly, the detected supercharging pressure may greatly differ due to this delay of operation.

Further, as disclosed in the above-mentioned publication, the supercharging pressure, corresponding to various engine rotational speeds, are stored as a map and a plurality of determination regions are provided. If hysteresis in the changing of the changeover valve between the determination regions is provided, the influence of the degree of opening of the changeover valve immediately before operation of the valve is increased so that the time lag is further increased.

SUMMARY OF INVENTION

The present invention has been made to solve such a problem and it is an object of the present invention to provide a breakdown diagnosis device for a variable displacement supercharger, which can enhance accuracy of breakdown determination, thus preventing an erroneous determination and properly detecting an abnormality of the variable displacement supercharger.

The variable displacement supercharging system according to the present invention includes a variable displacement supercharging system that includes a supercharger mounted on an engine, a flow passage area changing unit mounted on the supercharger and changes an area of an exhaust gas flow passage leading towards a turbine of the supercharger, a command unit which commands at least a change of the flow passage area to the exhaust gas flow passage area changing unit to a maximum flow passage area or a minimum flow passage area based on a rotational speed of the engine and a load of the engine, a supercharging pressure detection unit which detects a supercharging pressure of the engine, an engine rotational speed detection unit which detects the rotational speed of the engine, an engine load detection unit which detects the load of the engine, a memory which preliminarily stores a target supercharging pressure based on the engine rotational speed and the engine load, and an abnormality determination unit which, when the command for change of the flow passage area is given to the flow passage area change unit by the command unit such that the exhaust gas flow passage area assumes the maximum flow passage area or the minimum flow passage area, checks for an abnormality of the supercharger by comparing the target supercharging pressure obtained from the memory based on the engine rotational speed detected by the engine rotational speed detection unit and the engine load detected by the engine load detection unit with the supercharging pressure detected by the supercharging pressure detection unit.

Accordingly, when the exhaust gas flow passage area leading to the turbine assumes either the maximum flow passage area position or the minimum flow passage area position, the operating direction of the flow passage area changing unit is restricted in one direction, wherein when the exhaust gas flow passage area is stopped at such positions, the influence of inertia to the supercharging pressure is small so that the proper supercharging pressure can be detected whereby the abnormality of the variable displacement supercharger can be properly determined based on the supercharging pressure and the target supercharging pressure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

A preferred embodiment of the present invention is explained in detail hereinafter in conjunction with drawings.

Figure 1:
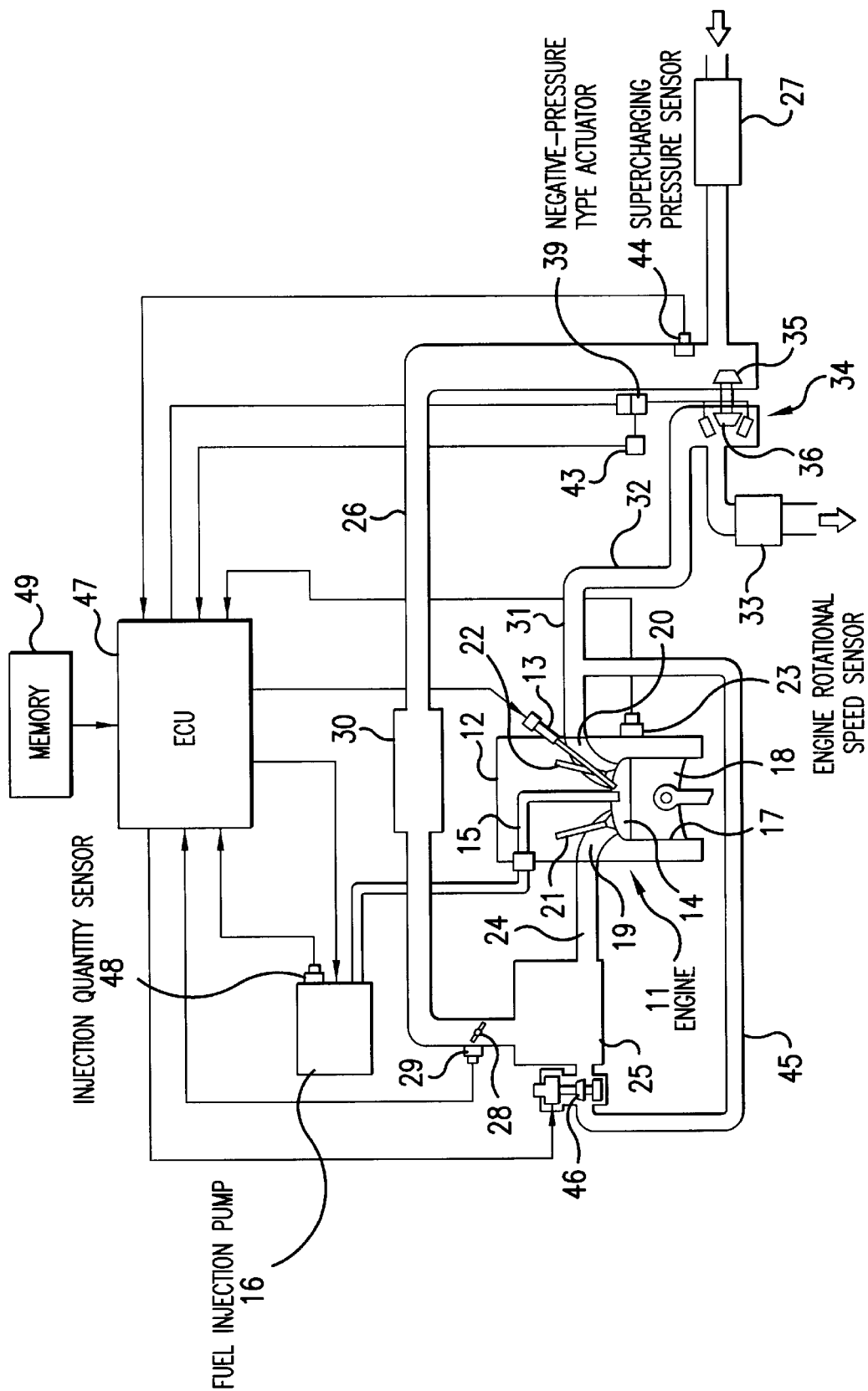
FIG. 1 is a schematic constitutional view of a variable displacement supercharging system according to a preferred embodiment of the present invention.
Figure 2:
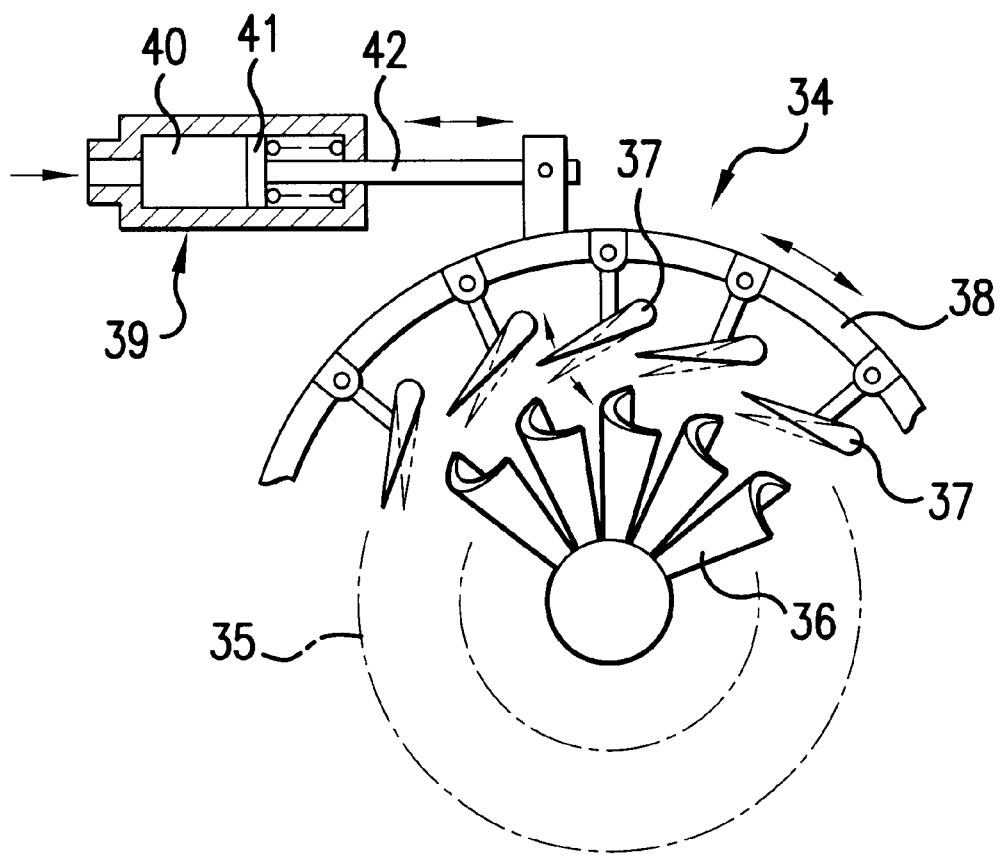
FIG. 2 is a schematic constitutional view of the variable displacement supercharging system.
Figure 3:
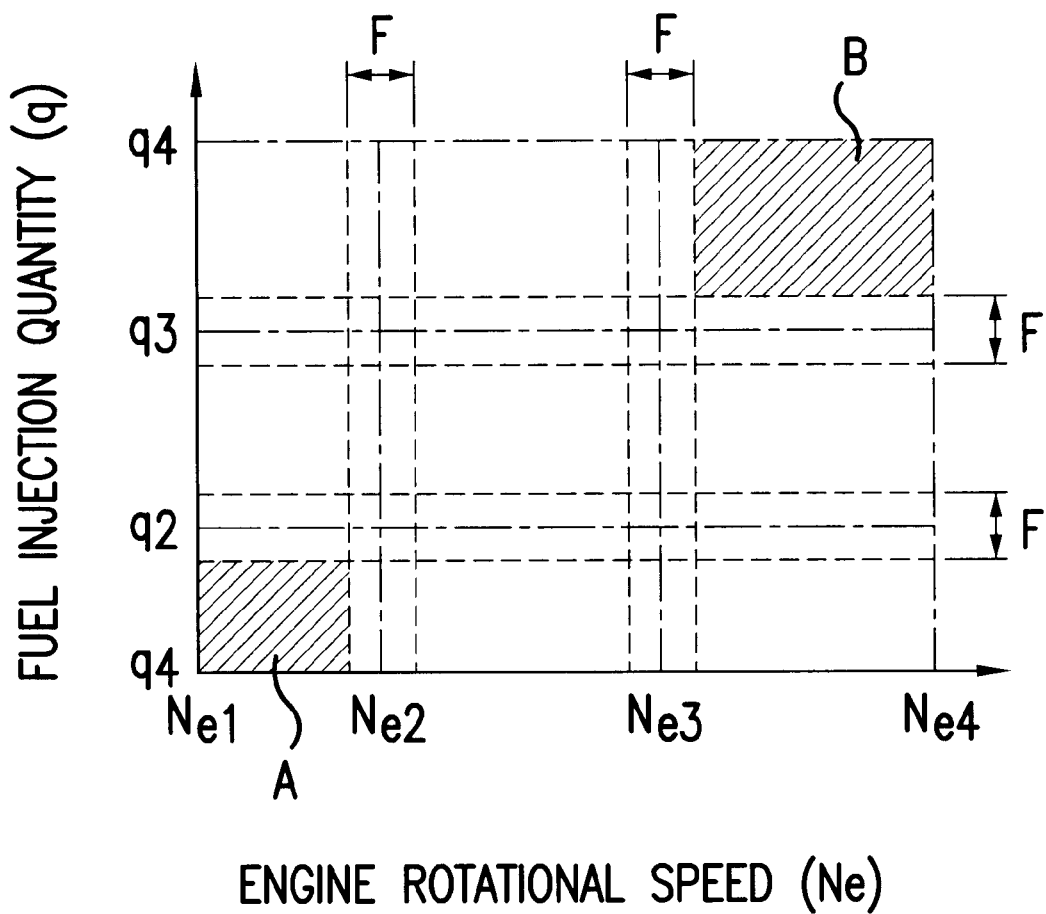
FIG. 3 is a diagnostic map of regions indicating breakdown.
Figure 4:
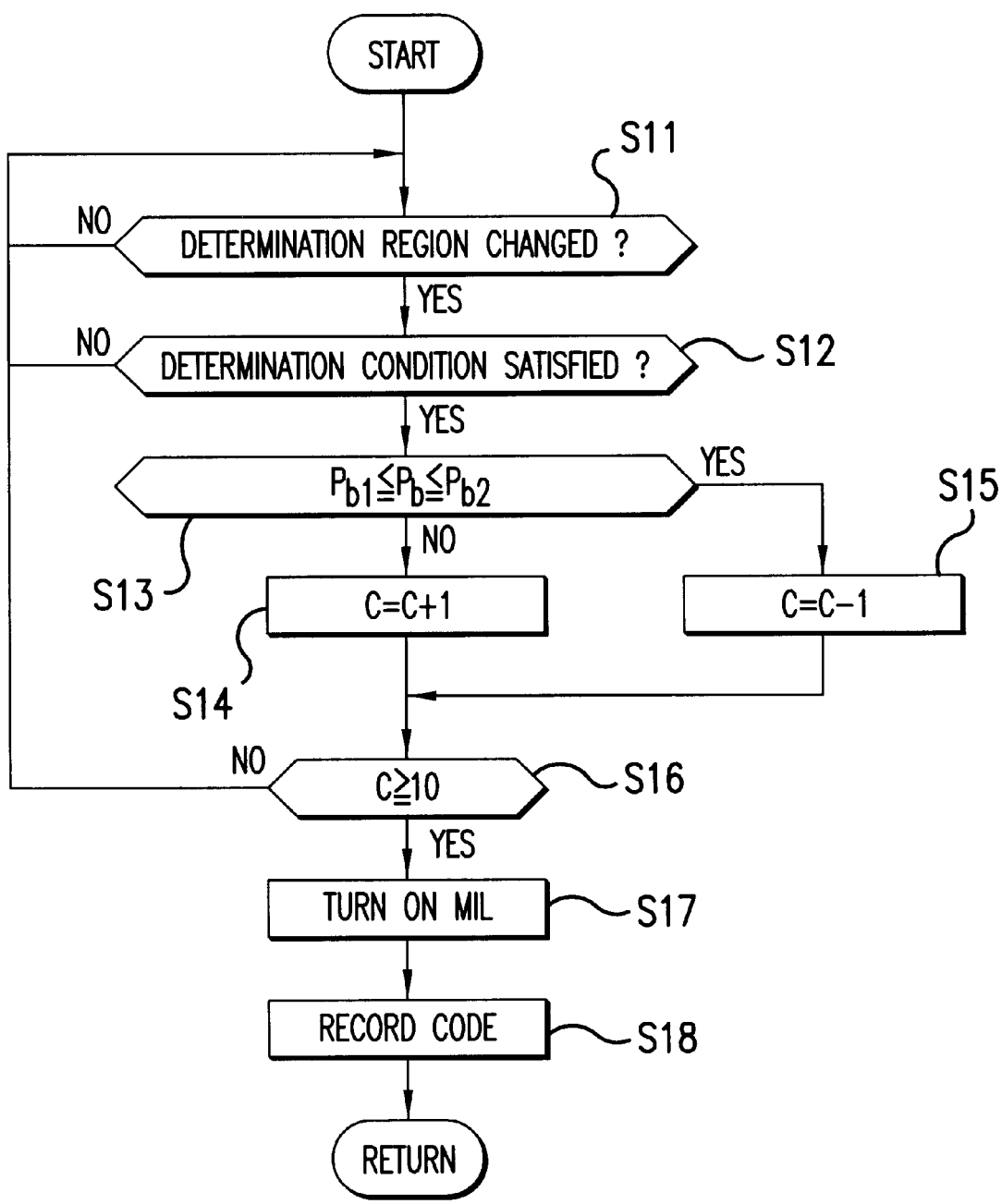
FIG. 4 is a flow chart showing a breakdown diagnosis method.

FIG. 1 shows the schematic constitution of a variable displacement supercharging system according to a preferred embodiment of the present invention, FIG. 2 shows a schematic constitution of a variable displacement supercharger, FIG. 3 is a diagnostic map of regions indicating breakdown, and FIG. 4 shows a flow chart expressing a breakdown diagnosis method.

In the variable displacement supercharging system according to this embodiment, as shown in FIG. 1, an engine 11 is a fuel cylinder injection type engine, which directly injects fuel into a combustion chamber. An ignition plug 13 and an injector 15, which has an injection port opened in the combustion chamber 14, are mounted on a cylinder head 12 for each cylinder. A fuel injection pump 16 is connected to the injector 15 through a fuel pipe such that fuel in a fuel tank, not shown in the drawing, can be supplied through the fuel pipe at a high fuel pressure and injected into the combustion chamber 14 from the injector 15 at a desired fuel pressure. Further, a piston 18 is provided inside a cylinder 17 of the engine 11 such that the piston 18 reciprocates in the upward and downward directions.

An intake port 19 and an exhaust port 20 that face and open into the combustion chamber 14 are formed in the cylinder head 12. The intake port 19 is opened or closed by driving an intake valve 21, while the exhaust port 20 is opened or closed by driving an exhaust valve 22. An intake-side cam shaft and an exhaust-side cam shaft, not shown in the drawing, are rotatably supported on an upper portion of the cylinder head 12. Upon rotation of the respective cam shafts, the intake valve 21 and the exhaust valve 22 are driven such that the respective ports 19, 20 can be opened or closed. Further, an engine rotational speed sensor 23, which detects an engine rotational speed, is mounted on the engine 11.

An intake pipe 26 is connected to the intake port 19 through an intake manifold 24 and a surge tank 25, and an air cleaner 27 is mounted on an air intake port of the intake pipe 26. Further, a throttle valve 28 and a throttle position sensor 29 for detecting the degree of opening of the throttle valve 28 are mounted on the intake pipe 26. Yet further, an inter-cooler 30 is mounted on the intake pipe 26.

On the other hand, an exhaust pipe 32 is connected to the exhaust port 20 through an exhaust manifold 31, and an exhaust purifying catalyst 33 is mounted on the exhaust pipe 32. A muffler, not shown in the drawing, is mounted downstream of the exhaust pipe 32.

Further, a variable displacement supercharger 34 is mounted on the engine 11. In this variable displacement supercharger 34, as shown in FIG. 1 and FIG. 2, a compressor 35 and a turbine 36 are connected to each other coaxially. A large number of nozzle vanes 37, each of which are rotatable, are arranged equidistantly around the turbine 36. The respective nozzle vanes 37 are connected to an annular ring 38. In a negative-pressure actuator 39, a piston 41 is movably supported in a negative-pressure chamber 40 and a driving rod 42 is connected to the ring 38. Accordingly, by changing the pressure inside the negative-pressure chamber 40. The driving rod 42 moves together with the piston 41 in response to the pressure state, and hence, the angle of the nozzle vanes 37 are changed by way of the ring 38 whereby the supercharging pressure can be adjusted. A stroke sensor 43, which detects an angle of the nozzle vanes 37, is mounted on the negative-pressure actuator 39. Further, a supercharging pressure sensor 44, which is positioned downstream of a compressor 35 of the supercharger 34 and detects the supercharging pressure, is mounted on the intake pipe 26.

Further, an EGR passage 45, which recirculates the exhaust gas, is provided between an upstream portion of the exhaust pipe 32 and a downstream portion of the intake pipe 26. EGR quantity can be adjusted in response to an open/close operation of an EGR control valve 46.

On a vehicle, an ECU (an electronic control unit) 47, which includes an inputting/outputting device, a memory device (ROM, RAM, a non-volatile RAM, and the like), a central processing unit (CPU), a timer counter, and the like, is mounted. A total control, including control of engine 11, is performed by the ECU 47. That is, to an input side of the ECU 47, besides the above-mentioned respective sensors 23, 29, 43, 44 and the like, an injection quantity sensor 48, which detects the fuel injection quantity of the fuel injection pump 16, is connected. Here, the injection quantity sensor 48 functions as an engine load sensor for detecting the load of the engine 11. Due to such a constitution, detection information from these sensors and the like are input to the ECU 47. On the other hand, to the output side of the ECU 47, the above-mentioned ignition plug 13, a driver of the injector 15, and the like are connected. The ignition plug 13 is connected by way of an ignition coil. Optimum values of the fuel injection quantity, the ignition timing, and the like, which are computed based on detection information from respective sensors and the like, are respectively output to the ignition plug 13, the driver of the injector 15, and the like. Due to such a constitution, a proper quantity of fuel is injected from the injector 15 at the proper timing and the ignition is performed at the proper timing by the ignition plug 13.

Here, in this embodiment, the variable displacement supercharging system is provided with a diagnosis function, which determines that a breakdown has occurred upon detection of an abnormality of the variable displacement supercharger 34 mounted on the engine 11. A target supercharging pressure Pb is experimentally obtained beforehand based on the engine rotational speed Ne and the fuel injection quantity q (engine load), and it is stored in the memory 49. The ECU determines the abnormality of the supercharger 34 by comparing the supercharging pressure detected by the supercharging pressure sensor 44 with the target supercharging pressure stored in the memory 49.

Here, since the inertia of the respective nozzle vanes 37 of the supercharger 34 greatly influences the supercharging pressure detected by the supercharging pressure sensor 44, the ECU 47 sets the determination conditions for comparing the detected supercharging pressure with the target supercharging pressure such that the supercharging pressure sensor 44 can detect the proper supercharging pressure as free from such influence as possible. In this case, the occurrence of abnormality is determined by comparing the detected supercharging pressure with the target supercharging pressure under the condition that the comparison is made when the nozzle vanes 37, which constitute supercharging pressure control operating members of the supercharger 34, assume the maximum flow passage area position (position indicated by a double dashed line in FIG. 2) or the minimum flow passage area position (position indicated by a solid line in FIG. 2). When the nozzle vanes 37 are stopped at one of these two positions, the operating direction is limited only to one direction (from a closed position to an opened position at the maximum flow passage area position, and from a opened position to a closed position at the minimum flow passage area position). Accordingly, the supercharging pressure sensor 44 is least influenced by the inertia of the respective nozzle vanes 37 when stopped, and thus, the supercharging pressure sensor 44 can detect the proper supercharging pressure, and, at the same time, it is possible to narrow the range of the target supercharging pressure so that the determination of the occurrence of abnormality can be performed with high accuracy.

Further, the determination is made while the running state of the engine 11 is restricted. As shown in FIG. 3, a diagnostic region map is prepared by dividing a graph of the target supercharging pressure, which is defined by the engine rotational speed Ne and the fuel injection quantity q, into a plurality of regions, and, at the same time, setting non-detection area F between respective regions. The target supercharging pressure is set for every region. In this case, when the running state of the engine 11 shifts to a different determination region, the position of the nozzle vanes 37 is changed and a time lag takes occurs with respect to the new detected supercharging pressure. To allow the supercharging pressure sensor 44 to detect the proper supercharging pressure with as little influence of this shifting of determination region as possible, a determination condition under which the ECU 47 may compare the detected supercharging pressure with the target supercharging pressure, is set. That is, check for abnormalities is made only where the running state of the engine 11 is in a region other than the non-detection area F in the determination region map, and, at the same time, when he running state is in region A where the engine rotational speed Ne is relatively low and the load is relatively low (small fuel injection quantity), or in region B where the engine rotational speed Ne is relatively high and the load is relatively high (large fuel injection quantity), by comparing the detected supercharging pressure with the target supercharging pressure. In the map shown in FIG. 3, the maximum engine rotational speed $Ne_4$ and the maximum fuel injection quantity $q_4$ are set to prevent excessive rotation of the supercharger.

Next, a breakdown diagnosis method of the supercharger 34 using the breakdown diagnosis device of this embodiment is explained based on the flow chart shown in FIG. 4. A case in which the determination conditions are set such that the nozzle vanes 37 of the supercharger 34 assume the maximum operating position, and the running state of the engine 11 is in the determination region A is explained here.

As described in the flow chart shown in FIG. 4, in step S11, it is determined whether the determination region is changed or not. At the time of starting the engine 11, it is assumed that the determination region is changed and proceeds to step S12. In this step S12, it is determined whether the determination conditions for performing the breakdown diagnosis of the supercharger 34 are established or not. The determination conditions are as follows.

(1) The ignition key switch is turned on;
(2) The exhaust gas purifying catalyst 33 is not being regenerated;
(3) The supercharging pressure sensor 44 has not broken down;
(4) The running state of the engine 11 is in the determination region A
   That is, engine rotational speed $Ne_1 \leq Ne \leq Ne_2$, and fuel injection quantity $q_1 \leq q \leq q_2$; and
(5) The nozzle vanes 37 of the supercharger 34 are at the maximum operating position.

In step S12, when all of these conditions (1) to (5) are satisfied, the processing proceeds to step S13 and the breakdown diagnosis of the supercharger 34 is performed. That is, in step S13, the ECU 47 checks for abnormality of the supercharger 34 by comparing the supercharging pressure Pb detected by the supercharging pressure sensor 44 with the target supercharging pressure prepared in the memory 49 as a map. In this case, the lowest supercharging pressure Pb1 and the highest supercharging pressure Pb2, when all of the conditions (1) to (5) are established, are defined in the memory 49. It is judged that the supercharger 34 is normal when the condition $Pb_1 \leq Pb \leq Pb_2$ is satisfied, while it is judged that the supercharger 34 is abnormal when this condition is not satisfied.

When it is judged that the supercharger 34 is abnormal in step S13, the number of abnormality determinations is added as (C+1) in step S14, while when it is judged that the supercharger 34 is normal in step S13, the number of abnormality determinations is subtracted as (C−1) in step S15. Then, in step S16, it is judged whether the number C of abnormalities is 10 or more and the processing returns to step S11 when the number C of abnormalities is less than 10.

Although the processing covering the above-mentioned steps S11 to S16 is repeated, the processing in step S12 and ensuing steps are not performed until the determination region A is changed, that is, until the running state is changed from the determination range A to a different determination range and then returns to the determination range A from the different determination range. When the processing from step S11 to step S16 is repeated and the number C of abnormalities reaches 10 times or more in step S16, the occurrence of abnormalities of the supercharger 34 is evaluated and it is diagnosed that the supercharger 34 has broken down. Then, an alarm lamp (MIL) is turned on in step S17 and a code is recorded in step S18.

Thereafter, when it is diagnosed that the supercharger 34 has broken down, the ECU 47 adjusts the EGR quantity by opening or closing the EGR control valve 46 to prevent the elevation of the supercharging pressure, for example.

In the above-mentioned embodiment, the determination condition is set such that the nozzle vanes 37 of the supercharger 34 assume the maximum flow passage area position and the running state of the engine 11 is in the determination region A. However, it is sufficient for the determination condition to satisfy either the condition that the nozzle vanes 37 of the supercharger 34 assume the maximum flow passage area position or the condition that the running state of the engine 11 assumes the determination region A. Further, it is possible to set the determination condition such that the nozzle vanes 37 of the supercharger 34 assume the minimum flow passage area position, and the running state of the engine 11 assumes the determination region B. Further, all of the above-mentioned conditions may be added to the determination condition.

In the explanation of the flow chart shown in FIG. 4 according to the above-mentioned embodiment, to clarify the features of the present invention and to simplify the explanation of the embodiment, it is configured that when the determination region is not changed in step S11, no processing is performed. However, in the actual operation, it is desirable that even when the determination region is not changed, the breakdown determination of the supercharger 34 is continuously performed within the same determination region such that the counting of the number of abnormalities (addition or subtraction) is not performed when the previous determination result and the present determination result are the same, and the counting of the number of abnormalities is performed when the previous determination result and the present determination result are different.

In this manner, according to the breakdown diagnosis device of the variable displacement supercharger of this embodiment, the supercharging pressure is preliminarily determined based on the engine rotational speed Ne and the fuel injection quantity q (engine load), the prescribed supercharging pressure Pb is stored in the memory 49, and the ECU 47 determines abnormality of the supercharger 34 by comparing the supercharging pressure detected by the supercharging pressure sensor 44 and the target supercharging pressure stored in the memory 49 under the condition that the nozzle vanes 37 of the supercharger 34 assume either the maximum or minimum flow passage area position and the running state of the engine 11 is in the low speed/low load region A or in the high speed/high load region B.

Accordingly, by setting the condition for carrying out the abnormality determination to be that the nozzle vanes 37 of the supercharger 34 assume the maximum or the minimum flow passage area and the running state of the engine 11 is in the low speed/low load region A or in the high speed/high load region B, the operating direction of the nozzle vanes 37 is restricted to one direction. When the nozzle vanes 37 of the supercharger 34 are stopped at these positions, the influence of the inertia and the influence of hysteresis characteristic to the supercharger is small, and hence, the proper supercharging pressure is detected with substantially no time lag for a given supercharging pressure to be obtained whereby the occurrence of abnormality of the variable displacement supercharger can be determined with high accuracy based on the detected supercharging pressure and the target supercharging pressure.

The condition that the nozzle vanes 37 of the supercharger 34 assume the maximum flow passage area position and the running state of the engine 11 is in the low rotation/low region A is none other than the idling running state after starting the engine 11. Therefore, the abnormality determination of the supercharger 34 can be performed frequently, whereby the breakdown of the supercharger 34 can be properly diagnosed.

In the above-mentioned embodiment, a region where there is no non-detection area F in the determination region map and corresponds to the region where the engine 11 is in the low rotation/low load region A or in the high rotation/high load region B is set to be a determination region. However, other regions, which have no non-detection area F in the determination region map, may be also set to be determination regions.

Further, in the above-mentioned embodiment, the injection quantity sensor 48, which detects the fuel injection quantity, is used as the engine load detection means. However, other sensors such as that which detects the degree of opening of the throttle valve, the degree of opening of the acceleration valve, the cylinder inner pressure, or the average effective pressure can be used as the engine load detection unit in place of the injection quantity sensor. Further, the variable displacement supercharger is not limited to the type of supercharger, which arranges a plurality of nozzle vanes 37 around the turbine 36, and may be constituted of a changeover valve, which opens or closes a portion of the exhaust gas passage. That is, according to the present invention, the type of the variable displacement supercharger is not limited.

Further, in the above-mentioned embodiment, as the supercharging pressure detection unit, the engine rotational speed detection unit and the engine load detection unit, the supercharging pressure sensor 44, the engine rotational speed sensor 23, and the engine load sensor 48, which detect the actual values, are used. However, the supercharging pressure detection unit is not limited to these sensors. For example, the supercharging pressure, the engine rotational speed, and the engine load may be detected by estimation based on the running state of the engine or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A variable displacement supercharging system, comprising:
    a supercharger mounted on an engine;
    a flow passage area changing unit mounted on the supercharger and capable of changing an area of an exhaust gas flow passage leading towards a turbine of the supercharger;
    a command unit which commands the flow passage area changing unit to change the area of the exhaust gas flow passage such that the exhaust gas flow passage area assumes at least one of a maximum flow passage area and a minimum flow passage area based on an engine rotational speed and an engine load;
    a supercharging pressure detection unit which detects a supercharging pressure to the engine;
    an engine rotational speed detection unit which detects the engine rotational speed;
    an engine load detection unit which detects the engine load;
    a memory which stores target supercharging pressure values determined based on the engine rotational speed and the engine load; and
    an abnormality determination unit that determines an abnormality of the supercharger by comparing the target supercharging pressure, determined from the memory based on the detected engine rotational speed and the detected engine load, with the detected supercharging pressure, when the flow passage area change unit changes the flow passage area to assume one of the maximum flow passage area and the minimum flow passage area based on a command by the command means.

2. A variable displacement supercharging system, comprising:

a supercharger mounted on an engine;

a flow passage area changing unit mounted on the supercharger and capable of changing an area of an exhaust gas flow passage leading towards a turbine of the supercharger;

a command unit having a map for commanding at least a change of the area of the exhaust gas flow passage such that the area assumes one of a maximum flow passage area and a minimum flow passage area based on an engine rotational speed and an engine load;

a supercharging pressure detection unit which detects a supercharging pressure to the engine;

an engine rotational speed detection unit which detects the engine rotational speed;

an engine load detection unit which detects the engine load;

a memory which stores a target supercharging pressure determined based on the engine rotational speed and the engine load; and an abnormality determination means that determines an abnormality of the supercharger by comparing the target supercharging pressure, determined from the memory based on the detected engine rotational speed and the detected engine, with the detected supercharging pressure, when the detected engine rotational speed and the detected engine load are in one of the maximum flow passage area and the minimum flow passage area.

3. A variable displacement supercharging system, according to claim 2, wherein the command unit includes a map that sets a plurality of regions determined based on the engine rotational speed and the engine load, the map expressing a size of the area of the flow passage for each region, determines the size of the area of the flow passage from the map based on the detected engine rotational speed and the detected engine load, and outputs commands to the flow passage area changing unit.

4. A variable displacement supercharging system, according to claim 1, wherein the command unit means includes a map that sets a plurality of regions determined based on the engine rotational speed and the engine load, the map expressing a size of the flow passage area for each region, determines the size of area of the flow passage from the map based on the detected engine rotational speed and the detected engine load, and instructs the flow passage area changing unit.

5. A variable displacement supercharging system, according to claim 1, wherein the abnormality determination unit determines the abnormality of the supercharger when the detected engine rotational speed is in a first relatively low predetermined rotational speed region in the map and the detected engine load is in a relatively low second predetermined load region in the map.

6. A variable displacement supercharging system, according to claim 1, wherein the abnormality determination unit determines the abnormality of the supercharger when the detected engine rotational speed in a first relatively high rotational speed region in the map and the detected engine load is in a second relatively high load region in the map.

7. A variable displacement supercharging system, according to claim 1, wherein the memory has a map which sets a plurality of regions based on the engine rotational speed and the engine load and expresses a size of the target supercharging pressure for each region.

8. A variable displacement supercharging system, according to claim 7, wherein the memory includes a map which sets non-detection areas between respective regions and the abnormality determination unit determines the abnormality of the supercharger when the detected engine rotational speed and the detected engine load are in the regions other than the non-detection band area in the map.

* * * * *